United States Patent [19]
Drever et al.

[11] Patent Number: 6,142,085
[45] Date of Patent: Nov. 7, 2000

[54] HYDRAULIC COMPRESSION SYSTEM FOR SEEDER

[75] Inventors: Kenneth Wayne Drever, Tompkins; James William Halford; Derek Christopher Opseth, both of Indian Head; William Robin Nell, Montmartre, all of Canada

[73] Assignee: Vale Farms Ltd., Indian Head, Canada

[21] Appl. No.: 09/338,555

[22] Filed: Jun. 23, 1999

[51] Int. Cl.$^7$ ..................................................... A01C 5/08
[52] U.S. Cl. .......................... 111/151; 111/187; 111/194; 172/260.5; 172/263
[58] Field of Search .................................... 111/151, 170, 111/187, 186, 194, 147, 52; 172/260.5, 261, 263–268

[56] References Cited

U.S. PATENT DOCUMENTS

| | | |
|---|---|---|
| 3,307,508 | 3/1967 | Russell ................................. 111/151 X |
| 4,762,075 | 8/1988 | Halford . |
| 5,331,907 | 7/1994 | Beaujot ..................................... 111/52 |
| 5,396,851 | 3/1995 | Beaujot ................................... 111/187 |

*Primary Examiner*—Christopher J. Novosad
*Attorney, Agent, or Firm*—Adrian D. Battison; Murray E. Thrift; Michael R. Williams

[57] ABSTRACT

A compression system for a dual material delivery assembly is described. The assembly includes a furrowing element for producing a furrow in the ground as it is towed across the ground. A fertilizer tube and a seed tube are provided for depositing fertilizer and seed at respective location in the ground. A packer wheel follows the tubes for packing earth on top of the seed. A biasing element provides a force on the furrowing element and the packer wheel. A control linkage mounts between the packer wheel and the furrowing element for controlling a distribution of the force between the furrowing element and the packer wheel.

18 Claims, 9 Drawing Sheets

FIGURE 2
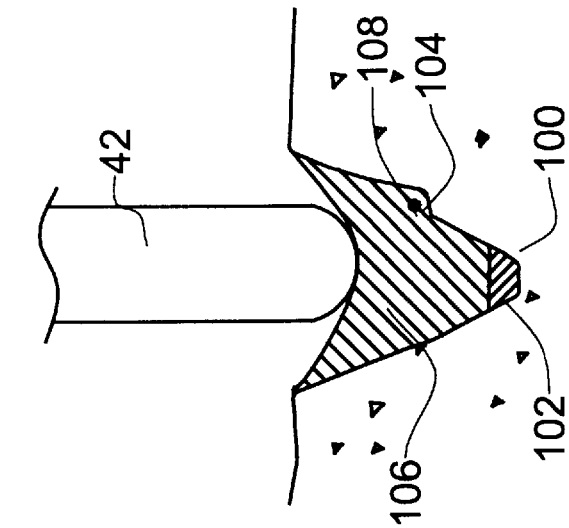
FIGURE 2A
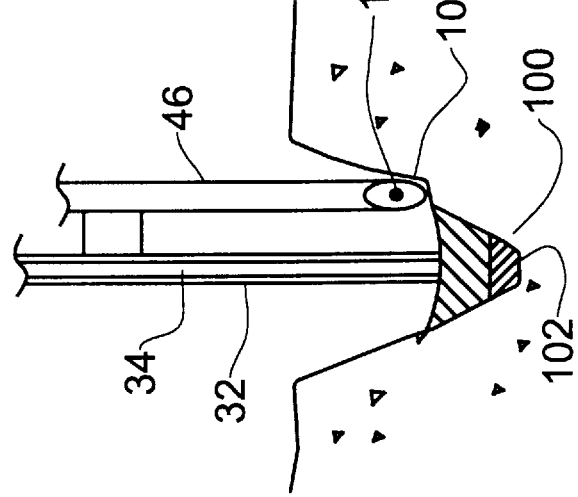
FIGURE 2B
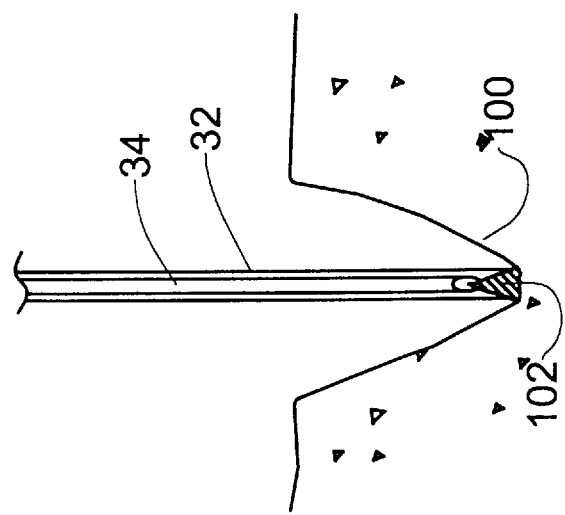
FIGURE 2C

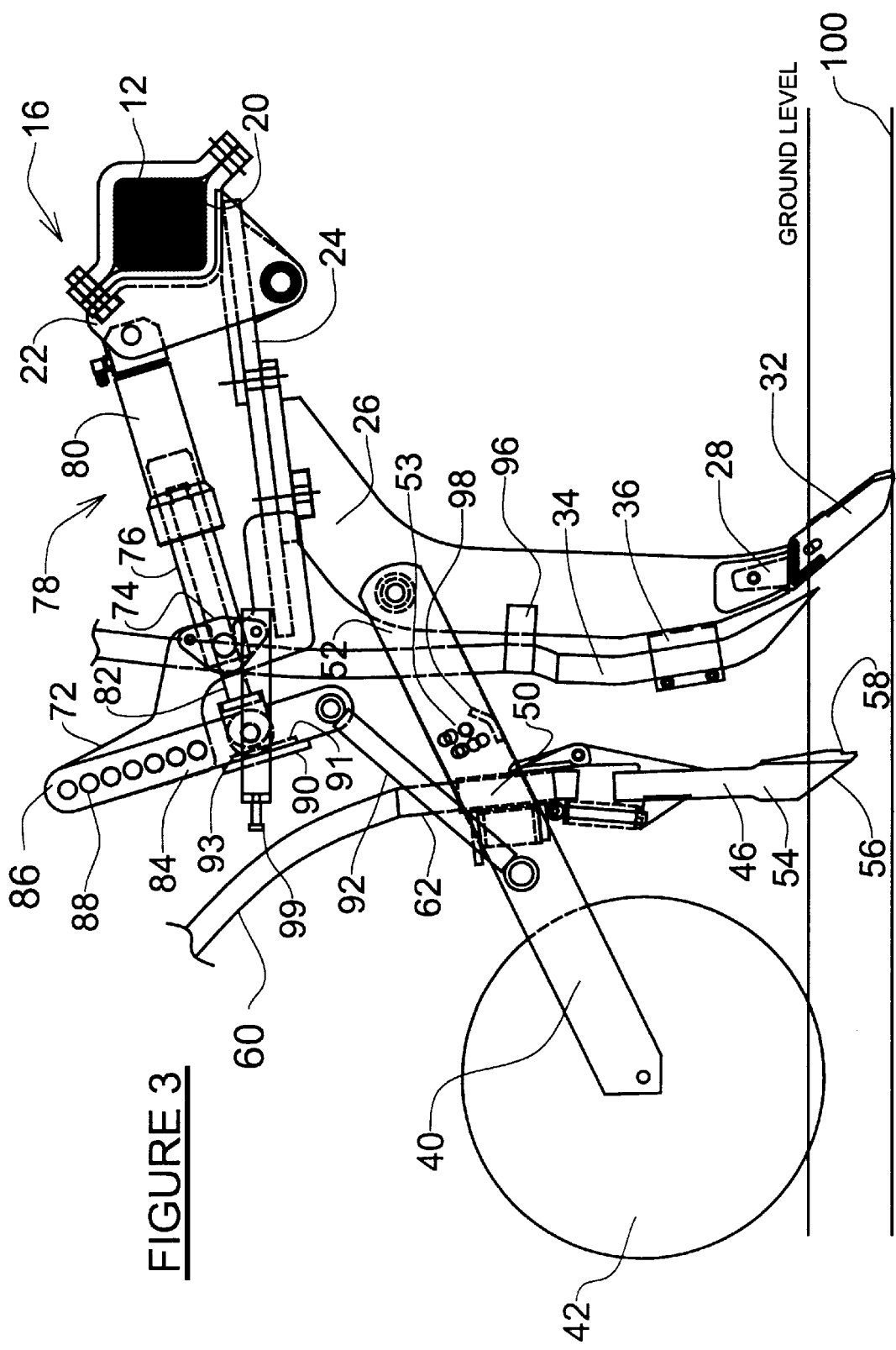

6,142,085

HYDRAULIC COMPRESSION SYSTEM FOR SEEDER

FIELD OF THE INVENTION

This invention relates to a dual material delivery apparatus for use on a seeder and more particularly to a compression system for the dual material delivery apparatus.

BACKGROUND

The use of a single assembly for mounting on a seeder and dispensing both fertilizer and seed in a single pass is known from prior U.S. Pat. No. 4,762,075 of one of the present inventors (Halford) and from subsequent U.S. Pat. Nos. 5,331,907 and 5,396,851 of Beaujot.

These assemblies generally include a furrowing element or knife for producing a furrow in the ground as the assembly is pulled across the ground and a fertilizer feed tube for depositing fertilizer directly behind the furrowing element. A second delivery member including a dispensing tube is provided spaced rearward and laterally offset from the furrowing element for depositing the seed in ground spaced at a position offset to one side from the fertilizer and preferably offset above. A packer wheel then follows for packing more earth above the seed.

A biasing element is generally provided for urging both the furrowing element and the packer wheel downward to engage the earth. In some known assemblies however the forces are more directed to one element rather than the other. When the forces are not properly distributed the resulting seeding operation becomes less effective. The arrangement shown in the above patent of Halford provides an arrangement using a shank for applying force to the knife and a separate spring for applying forces to the packer and second delivery member. In practice both are adjustable to provide independent adjustment of the separate forces for best control. The known assemblies of Beaujot provide instead an arrangement using hydraulic cylinders to apply the force. However these do not allow the distribution of force between the packer wheel and the second distribution member on one assembly and the furrowing element or knife on a second assembly to be adjusted independently and thus the seeder is less suited to varying conditions of the ground to be seeded.

The arrangement of Halford also uses a spring as a connection between two parts of a tube to allow flexibility of the tip end of the second delivery member. While this provides an inexpensive construction which allows the required operation, it does in some situations have a limited life as the spring is required to flex in a direction that tends to concentrate forces in one part of the spring leading to premature breakage at that location.

SUMMARY

It is one object of the present invention to provide an improved dual material delivery assembly arranged to allow the use of a hydraulic cylinder to apply force but allowing the necessary adjustment of forces of the first and second delivery parts separately.

According to one aspect of the present invention there is provided a dual material delivery assembly arranged to mount on a frame which is supported for movement in a forward direction, the assembly comprising:

a mounting bracket for mounting the assembly on the frame;

a furrowing element pivotally mounted on the mounting bracket, the furrowing element extending generally downward from the bracket to a ground penetrating end arranged to penetrate the ground for producing a furrow as the frame is moved across the ground in the forward direction;

a first material delivery tube mounted on a rearward face of the furrowing element for depositing a first material in the ground rearward of the ground penetrating end of the furrowing element;

a packer wheel support element mounted rearward from the furrowing element;

a second material delivery member mounted on the wheel support element including a second delivery tube spaced rearward from the first material delivery tube, the second material delivery member having a ground engaging end offset laterally and upward from the ground penetrating end of the furrow for engaging a side of the furrow and depositing a second material in the ground spaced upward and laterally offset from the first material;

a packer wheel mounted on the wheel support element rearward of the second material delivery member;

a fluid actuated cylinder for providing a force on the furrowing element and the packer wheel for urging the furrowing element and the packer wheel to engage the ground; and a control linkage mounted between the furrowing element and the wheel support element for controlling a distribution of the force between the furrowing element and the packer wheel.

The wheel support is preferably pivotally mounted on the furrowing element and extends generally rearward therefrom.

The control linkage preferably includes an adjustable mounting element having numerous linkage mounting locations thereon, each corresponding to a different distribution of the force between the furrowing element and the packer wheel.

The biasing element may comprise a hydraulic piston cylinder.

The biasing element may comprise a dual piston hydraulic piston cylinder having a cylinder end section pivotally mounted on the mounting bracket, a central section pivotally mounted on the furrowing element, the central section being slidably received in the cylinder end section and a piston end section pivotally mounted to the wheel support member, the piston end section being slidably received in the central section for distributing the forces to the furrowing element and the wheel support element.

When using a dual piston hydraulic piston cylinder, the control linkage preferably comprises a pair of links mounted between the furrowing element and the wheel support element, the piston end section being mounted on one of the links for controlling the distribution of the downward pressure force. Preferably there is provided numerous mounting locations on at least one of the links, each mounting location being arranged to mount the links at a different relative orientation therebetween corresponding to different distribution of the downward pressure force.

Alternatively, the control linkage may comprise an adjustable spring mounted between the wheel support member and the mounting bracket such that adjustment of a compression force of the spring adjusts a downward pressure on the wheel support element relative to the furrowing element. The adjustable spring can be replaced by a second cylinder, both cylinders being supplied from one or two hydraulic source and return reservoir.

The biasing element may comprise a hydraulic cylinder mounted between the furrowing element with the mounting bracket and the wheel support member pivotally mounted on the furrowing element to extend generally rearward therefrom.

The biasing element preferably comprises a linear actuator for producing a pair of opposing pressure forces at respective ends of the actuator, a first one of the pressure forces at a first end of the actuator including a downward component, the control linkage comprising at least one crank element pivotally mounted on the mounting bracket for redirecting a second one of the forces at a second end of the actuator to include a downward component, the downward components of the first and second forces corresponding to downward pressure forces acting on the packer wheel and the furrowing element such that the packer wheel and furrowing element can deflect upward independently resulting in a corresponding end of the linear actuator being deflected inward.

The crank element may comprise a crank arm on the wheel support element and a lever being pivotally mounted on the mounting bracket at a first end, the lever being connected to the crank arm at a second end, the actuator being mounted at a first end on the furrowing element and being mounted at a second end on the lever.

There may be provided a link connecting the lever to the crank arm, the lever and the crank arm having numerous mounting locations for mounting the link thereon, each mounting location corresponding to different length of the lever and the crank arm for adjusting the distribution of the force between the furrowing element and the packer wheel by selecting the mounting location of the link.

The actuator is preferably a hydraulic piston cylinder connected between the furrowing element and the wheel support element, the crank element being arranged to connect the hydraulic piston cylinder to the wheel support element.

The second material delivery tube may comprise:
  an upper tube portion and a lower tube portion;
  a pivot mounting the lower tube portion on the upper tube portion for pivotal movement of the lower portion relative to the upper portion;
  a communicating element connected between the upper and lower tube portions for communicating the lower tube portion with the upper tube portion as the upper and lower tube portions are pivoted relative to one another; and
  a secondary biasing element urging the lower tube portion to extend downward and forward for engaging the ground.

It is a second object of the present invention to provide an improved construction for the second delivery member which allows the required flexibility without the use of a coil spring which is flexed across its axis.

According to a further aspect of the present invention, therefore, there is provided a dual material delivery assembly arranged to mount on a frame which is supported for movement in a forward direction, the assembly comprising:
  a mounting bracket for mounting the assembly on the frame;
  a furrowing element being pivotally mounted on the mounting bracket, the furrowing element extending generally downward from the bracket to a ground penetrating end arranged to penetrate the ground for producing a furrow as the frame is moved across the ground in the forward direction;
  a first material delivery tube mounted on a rearward face of the furrowing element for depositing a first material in the ground rearward of the ground penetrating end of the furrowing element;
  a wheel support element mounted rearward from the furrowing element;
  a second material delivery member mounted on the wheel support element including a second material delivery tube spaced rearward from the first material delivery tube, the second material delivery member having a ground engaging end offset laterally and upward from the ground penetrating end of the furrow for engaging a side of the furrow and depositing a second material in the ground spaced upward and laterally offset from the first material;
  a packer wheel mounted on the wheel support element rearward of the second material delivery tube; and
  a main biasing element urging the furrowing element and the wheel support element to engage the ground;
  the second material delivery tube comprising;
  an upper tube portion and a lower tube portion;
  a pivot mounting the lower tube portion on the upper tube portion for pivotal movement of the lower portion relative to the upper portion;
  a tubular connecting element connected between the upper and lower tube portions for connecting the lower tube portion with the upper tube portion for communication of materials therethrough as the upper and lower tube portions are pivoted relative to one another; and
  a secondary biasing element urging the lower tube portion to extend downward and forward for engaging the ground.

A lug may be mounted on a forward face of the lower tube portion, the lug extending upward for engaging a forward face of the upper tube portion in a working position such that a deflection of the lower tube portion in response to ground contours is restricted in the forward direction.

The secondary biasing element preferably comprises a hydraulic or pneumatic piston cylinder mounted at a first end to the upper tube portion at a position spaced upward from the pivot and mounted at a second end on the lower tube portion at a position spaced downward from the pivot. There may be provided a rearward extending lug on the lower tube portion for mounting the cylinder thereon such that the lug acts as a crank for pivoting the lower tube portion relative to the upper tube portion as the piston cylinder is contracted and extended.

Alternatively, the secondary biasing element may comprise a spring connected between the upper and lower tube portions. The spring is preferably mounted about a longitudinal axis, the spring being mounted at a first end on the upper tube portion at a position spaced upward from the pivot and at a second end on the lower tube portion at a position spaced downward from the pivot such that the spring is extended and contracted along the longitudinal axis as the lower tube portion is pivoted relative to the upper tube portion.

Preferably there is provided a control linkage mounted between the furrowing element and the wheel support element for controlling a distribution of the forces between the furrowing element and the packer wheel.

BRIEF DESCRIPTION OF THE DRAWINGS

In the accompanying drawings, which illustrate exemplary embodiments of the present invention:

FIGS. 2A, 2B and 2C are rear elevational views of the furrowing element, the second material delivery tube and the packer wheel respectively.

FIG. 3 is a side elevational view of the assembly of FIG. 1 with the elements in a normal operating position.

DETAILED DESCRIPTION

Figure 1:
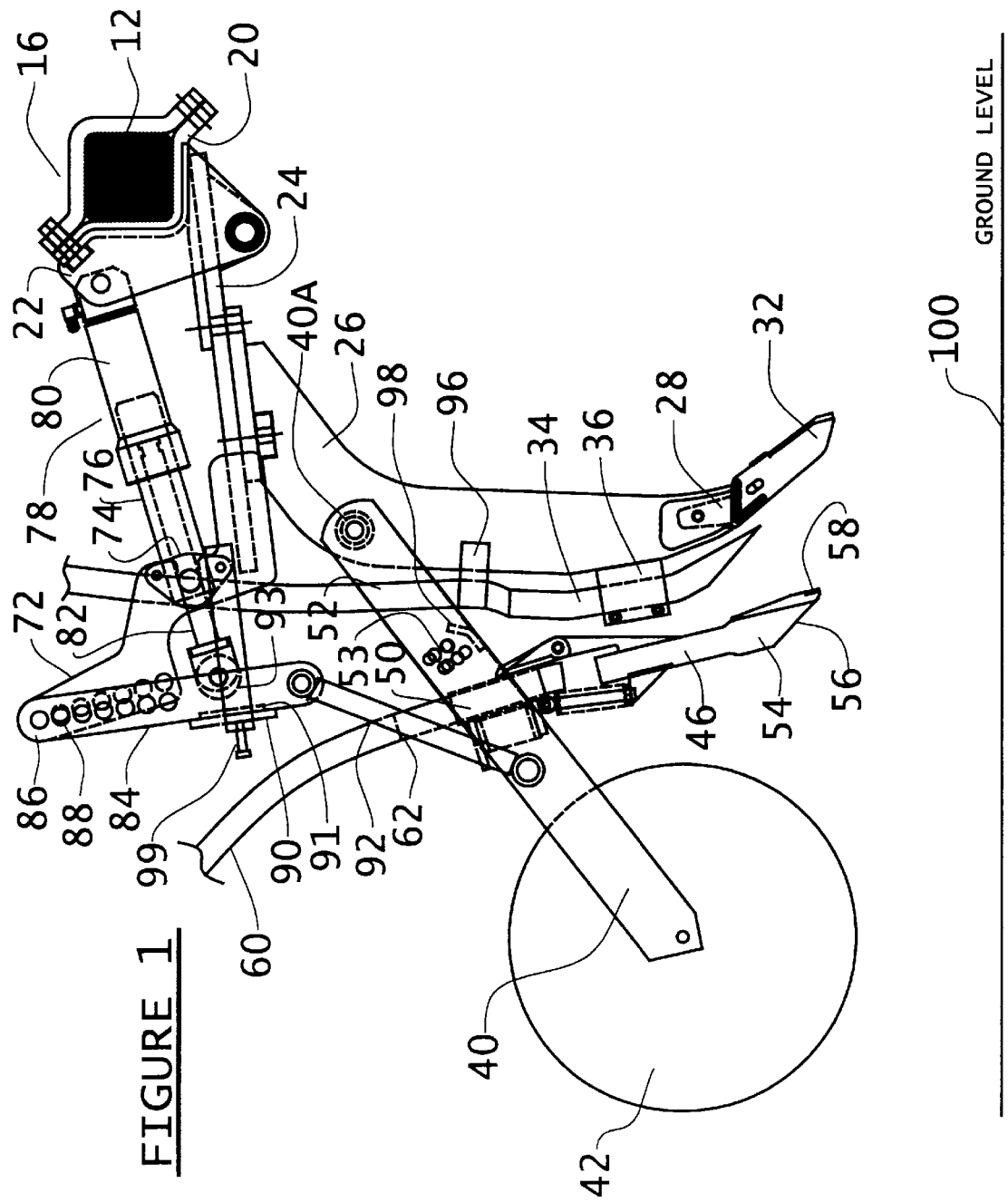
FIG. 1 is a side elevational view of a first embodiment of the dual material delivery assembly, showing the elements in a position as the frame is lifted thus allowing the packer wheel and second tube to drop toward the knife.

Referring to the accompanying drawings, there is illustrated a dual material delivery assembly generally indicated by reference numeral 10. A frame 12 of a seeder is supported for movement in a forward direction 14 and mounts a plurality of the dual material delivery assemblies 10 at laterally spaced locations thereon.

Each assembly 10 includes a mounting bracket 16 having an upper plate 18 and a lower plate 20. The upper and lower plates 18, 20 each have a bent portion arranged to receive a portion of a rectangular member of the frame 12 therein. Both plates together extend around the rectangular member and can be bolted to each other at respective ends for securing the plates to the frame.

A pair of spaced apart and upright plates 22 extend rearward and downward from the mounting bracket 16. An elongate and rectangular base member 24 is pivotally mounted at a forward end between the upright plates 22 at a position spaced below the frame member. A knife support member 26 mounts on a bottom face of the base member 24. The knife support member 26 is curved at an upper end to extend rearward from the base member and then extend downward to a ground penetrating end 28. The ground penetrating end 28 mounts a knife 32 thereon as described in published PCT Application WO 98/37749 of Halford et al. The knife 32 is arranged to engage the ground and ploughs a furrow in the ground in a working position as shown in FIGS. 2 and 3 when the frame is pulled in the forward direction 14.

A first material delivery tube 34 is mounted on a rearward face of the knife support member by a bracket 36. A bottom end of the tube 34 is inclined forward similarly to the knife 32 for depositing fertilizer in the furrow behind the knife. A top end of the first material delivery tube is arranged to mount a feed tube 38 thereon which is connected to a fertilizer container usually mounted on a separate trailer for supplying the fertilizer to the first material delivery tube. The tube 34 may include an additional portion extending downwardly to a position closely adjacent the ground behind the knife. As is well known, a second tube can also be provided adjacent the tube 34 for dispensing liquid fertilizer or anhydrous ammonia.

A packer wheel support member 40 in the form of two parallel arms is mounted at a forward end on a pivot coupling 40A on a side of the knife support member 26 adjacent the base member 24. The wheel support member 40 is arranged to extend downward and rearward to an outer end which mounts a packer wheel 42 thereon between the two arms.

A second material delivery tube 46 is mounted on an adjustable support bracket 52 located between the two arms of the wheel support member 40 at a position spaced between the packer wheel and the knife support member. The bracket 52 is also pivotal on a bushing 40A. The inclination between the bracket 52 and the wheel support member is thus adjustable by pivoting the bracket relative to the member about the bushing 40A for adjusting the relative height and inclination of the second material delivery tube. A plurality of co-operating apertures 53 in the bracket 52 and in the wheel support member 40 are arranged to receive a locking pin therethrough for securing the bracket to the wheel support member at any one of numerous relative positions therebetween after adjustment thereof.

The second material delivery tube extends downward from the bracket 52 to a ground engaging end 54. The ground engaging end 54 is spaced laterally outward and upward from the end of the knife for engaging a side of the furrow as the frame is pulled in the forward direction such that a portion of the soil along the side of the furrow is moved over onto the fertilizer which has already been deposited by the first material delivery tube. An opening 56 at the ground engaging end of the second material delivery tube then deposits seed in the furrow spaced upward from the fertilizer and separated from the fertilizer by a layer of earth.

The tube end 54 can be adjusted so that its position can be at the same height as the bottom of the knife thus locating the seed at the same depth as but offset to one side of the fertilizer.

The second delivery of the seed can be effected by simply a tube, by a reinforced tube as shown or by a delivery member which includes an additional knife. However, each of these devices operated in effect to follow in the furrow formed by the first knife without the necessity to cut an additional separate furrow.

The ground engaging end 54 of the second material delivery tube includes an engaging tip 58 mounted on a forward face for reducing wear. In the embodiment shown, the tip extends upwardly along substantially the whole length of the tube to act as a reinforcement therefor. The opening 56 is slanted upward and rearward from the engaging tip 58 for depositing the seed behind the tip. A top end of second material delivery tube connects to a feed tube 60 which supplies seed to the tube from a seed container on the separate trailer.

Figure 5:
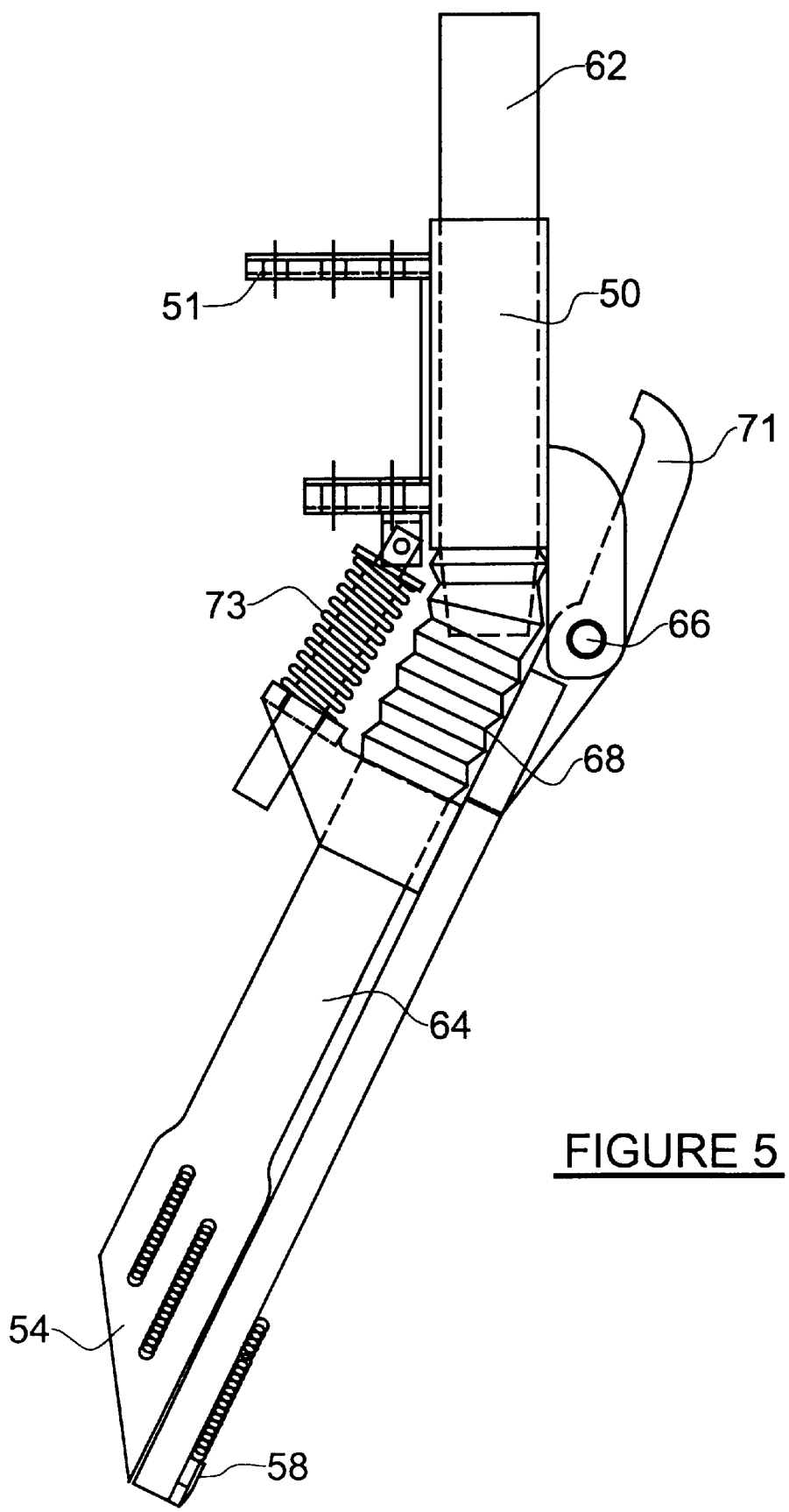
FIG. 5 is an enlarged view of the second material delivery tube in a deflected position.

As shown in FIG. 1 and in greater detail in FIG. 5, the second material feed tube includes a top portion 62 and a bottom portion 64 which are connected by pivot 66. The pivot 66 includes a first lug mounted on the top portion 62 which is pivotally coupled to a second lug on the bottom portion 64 for pivotal movement of the bottom portion in relation to the top portion. A flexible tubular coupling 68 is connected between the top and bottom portions 62, 64 to permit the passage of the seed from the top portion to the bottom portion as they are pivoted relative to one another. A hydraulic or pneumatic piston cylinder 70 connects between the top and bottom portions at respective positions spaced from the flexible coupling. A rearward extending lug 69 on the bottom portion 64 mounts a bottom end of the piston cylinder thereon such that the lug acts as a crank for pivoting the bottom portion as the piston cylinder is contracted and extended. The piston cylinder 70 is pressurized and connected to a relief reservoir for urging the engaging tip 58 of the second material delivery tube downward into the ground while permitting the tip to deflect upward if an obstacle is engaged for protecting the tip in use. The tube 46 is shown in a non deflected position in FIG. 1 where a stop 71 extending from the second lug is engaged against a forward face of the top portion of the tube. The stop 71 is located so as to prevent deflection of the tube 46 in a forward direction.

An enlarged view of the second material delivery tube in a deflected position is shown in FIG. 5. Also shown in FIG. 5, the piston cylinder 70 is replaced by a spring 73 in an alternative arrangement. The spring 73 is mounted about a longitudinal axis between the upper and lower portion of the second material tube, similarly to the piston cylinder 70, such that the spring is extended and contracted along the longitudinal axis as the lower tube portion is pivoted relative to the upper tube portion. The springs thus act to urge the tip 58 into the furrow edge as described above.

Figure 4:
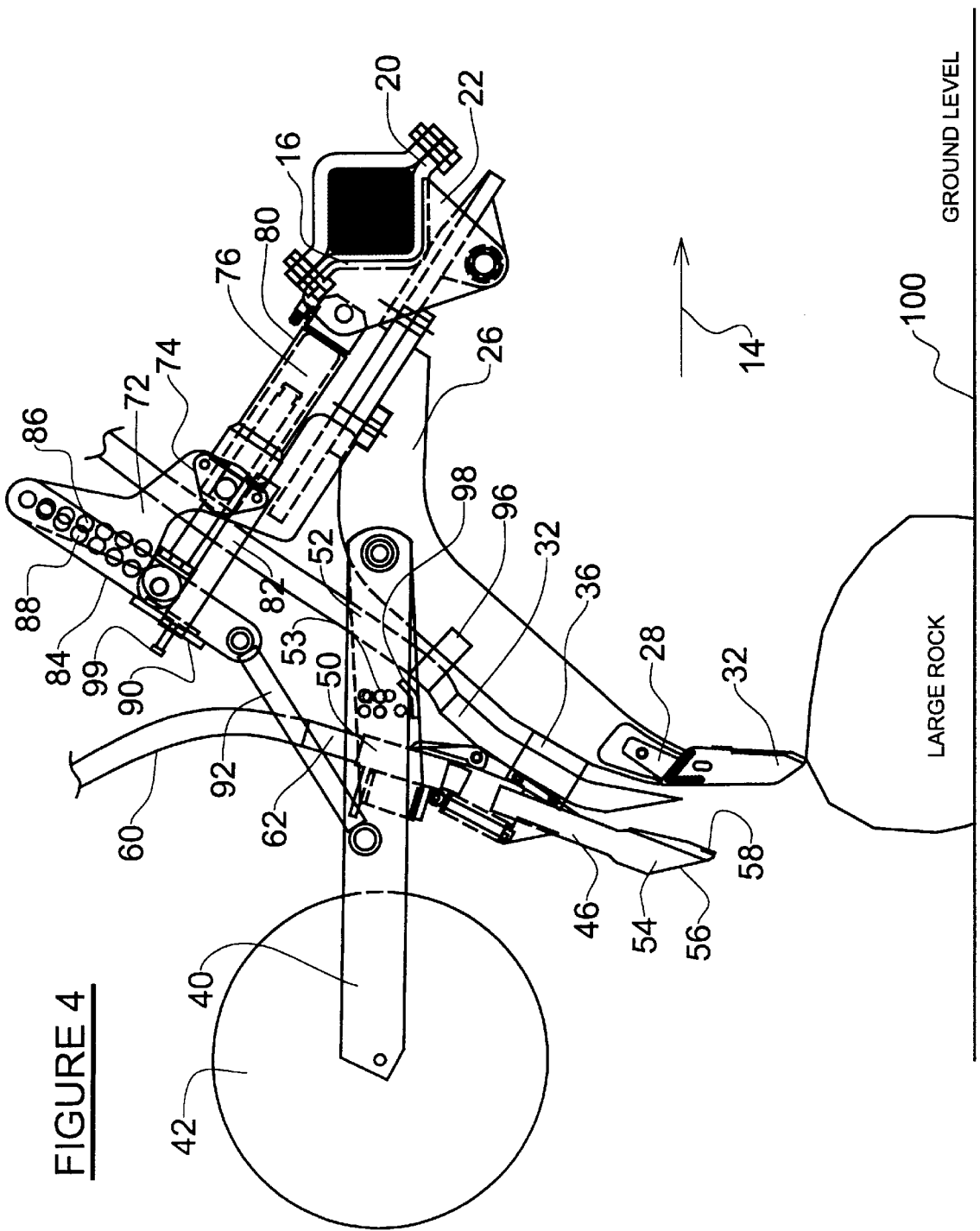
FIG. 4 is a side elevational view of the assembly in a raised tripped position by engagement of the knife with an obstacle.

Referring to FIGS. 1, 3 and 4, a mounting plate 72 is mounted on a rearward end of the base member 24 to extend generally upward and rearward therefrom. The mounting plate 72 is mounted in an upright position and includes a mounting point 74 thereon for pivotally mounting a central section 76 of a dual piston hydraulic piston cylinder 78 thereon. The central section 76 acts as a piston within a cylinder end section 80 which is pivotally mounted at an outer end between the upright plates 22 adjacent a top end of the mounting bracket 16.

The central section 76 also acts as an intermediate cylinder for slidably receiving a piston end section 82 therein. The piston end section 82 is mounted at an outer end to a first link member 84.

The mounting plate 72 includes a plurality of apertures 86 adjacent a top end thereof for pivotally mounting a top end of the first link member 84 thereon. The link member 84 also includes a plurality of apertures 88 therein for pivotally mounting the first link member 84 on the mounting plate through any co-operating pair of the apertures 86 and 88.

The first link member 84 includes a track roller in a clevis or ball transfer 89 at its outer end where it engages a plate 90 attached to the first link member 84. This mounting of the of the piston end section 82 is required because the piston end section is required to remain coaxial with the other section 76 and 80 as the first link is pivoted and as the base member is pivoted relative to the frame 12.

An adjustable restraining linkage 91 is connected to the mounting plate 74 to prevent the piston end section 82 from fully extending beyond the central section 76 when pressure is applied. This also permits the adjustment of the packer wheel 42 relative to the frame 12 when unit 10 is above the ground. A U-shaped bracket 99 attached to the link 72 engages the back of the plate 90 to prevent the cylinder from expanding too far.

A second link member 92 pivotally mounts between a bottom end of the first link member 84 and the wheel support member 40 adjacent and rearward from the second material delivery tube 46.

In use, the dual piston hydraulic piston cylinder 78 urges both the knife 32 and the packer wheel 42 downward to engage the ground, while permitting relative movement between the wheel support member and the knife support member. The first and second link members and the dual piston cylinder 78 co-ordinate the deflections of the knife support member in response to obstacles with the deflections of the wheel support member also in response to obstacles. The link members and the piston cylinder allow independent deflection of the knife in relation to the packer wheel as well as independent rotation of the packer wheel support member in relation to the knife.

In FIG. 3, the packer wheel is shown in the normal operating position. The piston end section of the hydraulic piston cylinder 78 and the first and second links can float upward and inward while the knife support member remains in operating position. The ability of the packer wheel to float upward in relation to the knife allows the assembly to more closely follow the contours of the ground as the assembly is passed over the ground.

The piston cylinder 78 is connected to a pressure relief reservoir for releasing the downward pressure on the knife in the case of a large obstacle such as a rock as shown in FIG. 4. This protects the assembly from unnecessary damage. The use of the pressure relief reservoir is a known arrangement.

The range of the deflection of the knife support member 26 is limited by the stroke of the piston 76 in cylinder 80

A lug 96 mounted on the knife support member extends generally rearward therefrom for engaging a stop 98 on the wheel support member when the knife support member is deflected rearward toward the wheel support member.

The assembly is lifted into the raised position of FIG. 1 by raising the frame 12 thus causing the elements to drop relative to the frame until the knife is raised above ground level for transportation.

FIGS. 2A through 2C show the action of the assembly as it is displaced in the forward direction across the ground. In FIG. 2A, the knife is shown ploughing a furrow 100, while the first material feed tube deposits fertilizer 102 in the bottom of the furrow. In FIG. 2b, the second material delivery tube is shown in an offset position such that the engaging tip engages the side 104 of the furrow for turning over some of the earth 106 on top of the fertilizer while seed 108 is deposited on top of the turned over earth. The packer wheel is then shown in FIG. 2C, also in a position behind the first and second material delivery tubes, for engaging the soil in the furrow and packing the soil moved over more the fertilizer 102 and the seed 108.

The adjustable mounting of the first link on the mounting plate due to the apertures 86 and 88, allows the distribution of the force of the dual piston hydraulic piston 78 between the packer wheel and the knife to be adjusted. In this arrangement a single hydraulic piston cylinder is able to provide independent downward pressure force to two different elements on the assembly. The distribution of the downward pressure force is adjusted by mounting the links at a different relative positioning.

Figure 6:
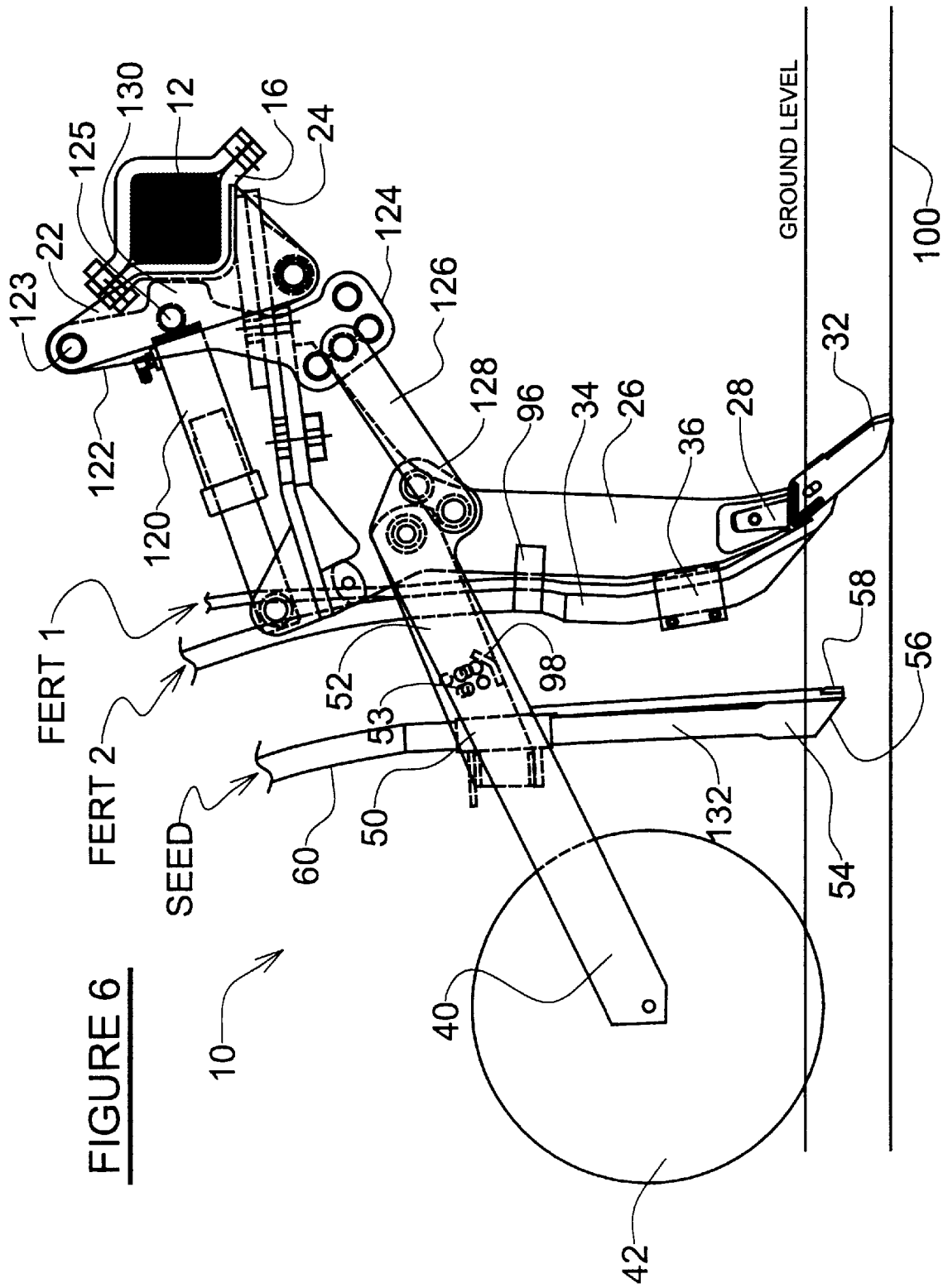
FIG. 6 is a side elevational view of a second embodiment of the material delivery assembly.

In a second embodiment of the assembly as shown in FIG. 6, the knife and wheel support members 26, 40 are arranged in relation to the mounting bracket 16 similarly to the first embodiment. The dual piston hydraulic piston cylinder 78 as well as the first and second link members are replaced by a single hydraulic piston cylinder 120. The hydraulic piston cylinder 120 is pivotally mounted at a piston end on the base member 24 at a position spaced from the mounting bracket and extends generally forward and upward therefrom.

A first link member 122 is pivotally mounted at a top end 123 between the upright plates 22 at a position spaced upward and rearward from the mounting bracket 16. The first link member 122 extends generally downward from the top end to a bottom curved end 124 which curves forward. The hydraulic piston cylinder 120 pivotally mounts at a cylinder end on the first link member 122 at a position 125 spaced between the top and bottom curved end.

A second link member 126 is pivotally mounted at a forward end on the bottom curved end 124 at one of numerous positions spaced on the bottom curved end of the first link member. The second link member 126 extends generally rearward therefrom for pivotally mounting at a rearward end on the wheel support member.

The wheel support member 40 is modified from that of the first embodiment by the addition of a crank portion 128 which extends forward and downward from the pivotal mounting point of the wheel support member. The wheel support member thus acts as a bell crank. Mounting the forward end of the second link member 126 on the curved end 124 of the first link member 122 at different position also adjusts the force on the packer wheel. More than one mounting apertures in the crank portion 128 can be used to allow the second link member 126 to be mounted on the crank portion at selected positions for adjusting the force that is applied to the packer wheel.

The first and second link members 122, 126 are arranged such that when the knife 32 is deflected upward due to a small obstacle the first and second link members are pivoted forward and the bell crank shaped wheel support member resultantly pivots the packer wheel slightly downward keeping it in contact with the ground. When a large obstacle is encountered, the knife is deflected to a greater degree until a stop 96 on the rearward face of the knife 26 engages a stop bar 98 of the mounting bracket 52 thus lifting the packer wheel 42 off the ground.

Alternatively, the upward deflection of the packer wheel due to the contours of the terrain transfers the downward force to the knife, allowing the packer wheel to deflect upward independently of the knife. The hydraulic piston cylinder 120 is thus positioned to urge both the packer wheel and knife downward when pressurized while the links allow the packer wheel and knife to deflect independently to some degree. Raising the frame 12 allows the assembly to be raised in a transport position similar to the first embodiment shown in FIG. 7.

The second material delivery tube 46 may be modified such that there is no pivot 66 between the upper and lower portions but rather a rigid tube 132 is used for deflection with the wheel support member upward and downward as the engaging tip 58 of the tube 46 follows the contours of the ground.

The adjustable mounting of the second link 126 on the first link 122 due to the numerous mounting locations on the curved bottom end and on the wheel support member 40 at the end 128, allows the distribution of the force of the hydraulic piston cylinder 120 between the packer wheel and the knife to be adjusted. In this arrangement a single hydraulic piston cylinder is able to provide independent force to two different elements on the assembly. Deflections at opposing ends of the same cylinder correspond to deflections of either the knife or the packer wheel. The distribution of the force is adjusted by mounting the second link 126 at different relative positions between the second link 126 and the first link 122 or the wheel support member 40.

The hydraulic piston cylinder 120 produces a pair of opposing forces at respective ends. A first one of the forces at the piston end of the piston cylinder 120 includes a downward component due to the inclination of the piston cylinder and the shape of the knife support member being pivotal about a forward end of the base member. A second one of the forces at the cylinder end of the piston cylinder 120 urges the first link 122 forward which acts as a lever for cranking the bell crank shaped wheel support member such that the resulting force includes a downward component producing a downward force on the packer wheel 42. An upward deflection of either the knife support member or the packer wheel will independently deflect the corresponding end of the hydraulic piston cylinder inward.

The numerous mounting locations of the second link 126 on both the crank portion 128 of the wheel support member and the first link 122 allow an effective length of the crank portion and the first link to be adjusted which affects the force of leverage produced on the packer wheel 42 when the hydraulic piston cylinder 120 is pressurized and produces a force which acts on the links. This adjustment of mounting locations of the second link 126 thus controls the distribution of the downward force between the packer wheel 42 and the knife 32 as noted previously.

Figure 7:
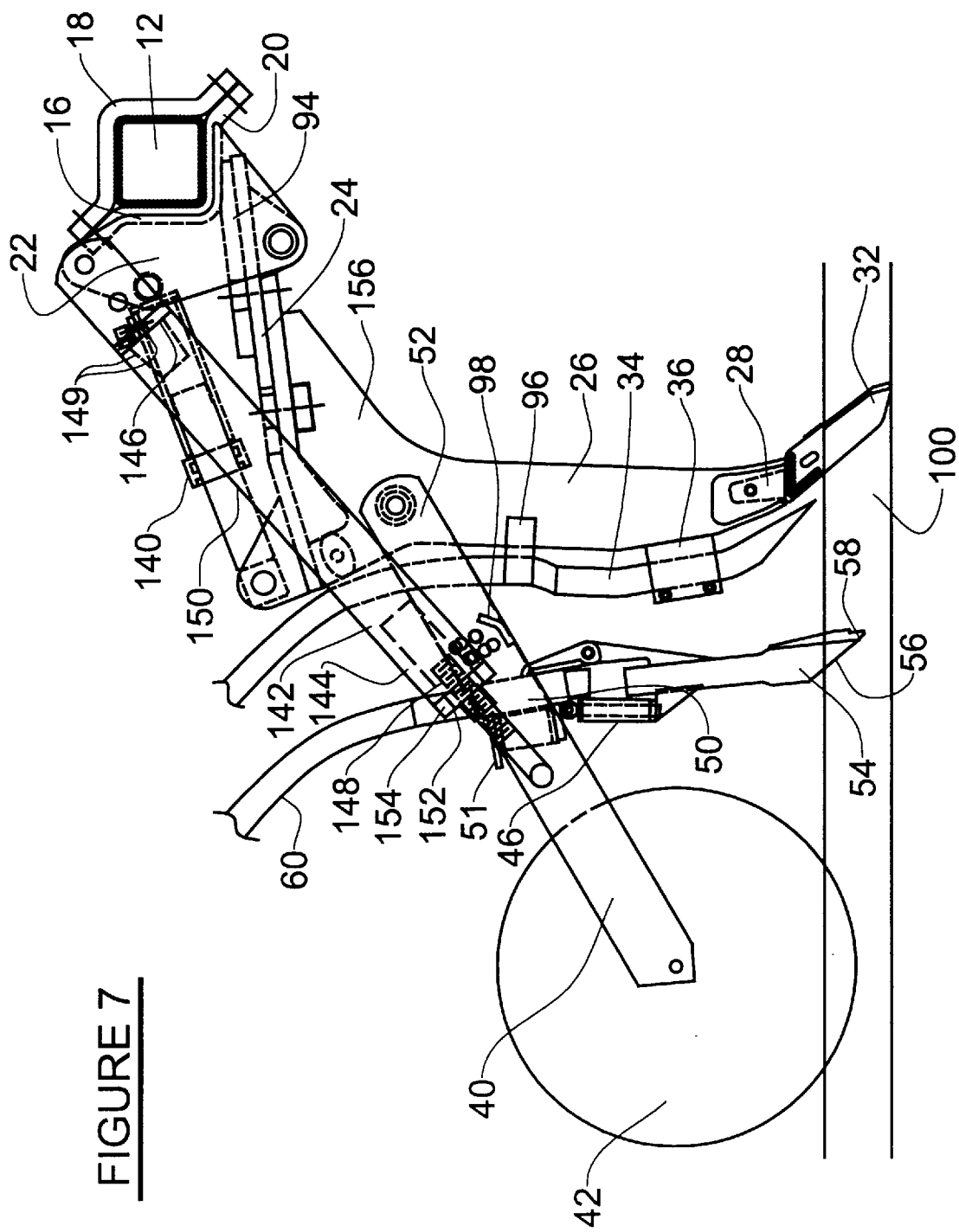
FIG. 7 is a side elevational view of a third embodiment of the dual material delivery assembly.
Figure 8:
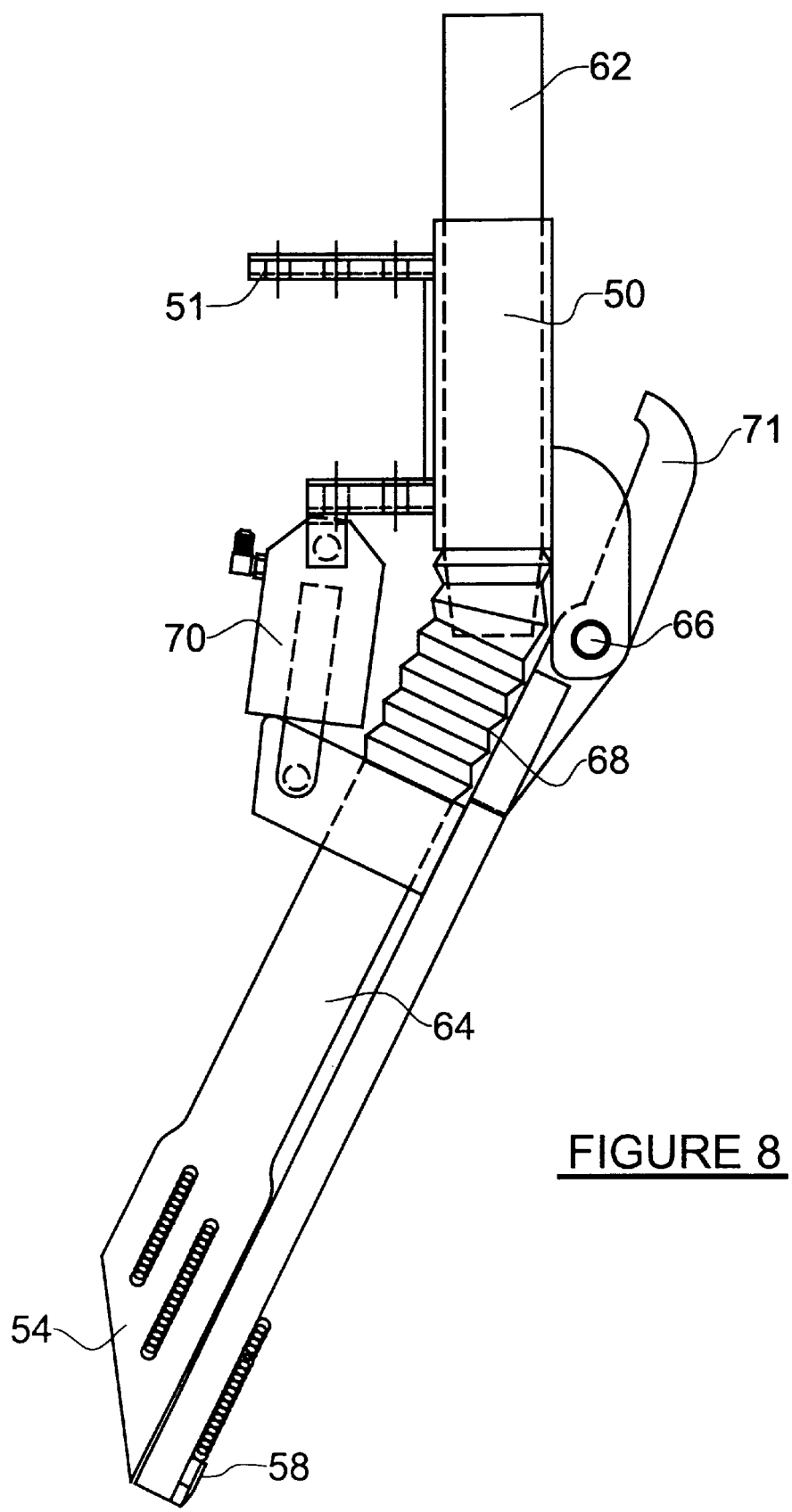
FIG. 8 is a side elevational view similar to that of FIG. 5 showing an alternative arrangement of the second material delivery tube.
Figure 9:
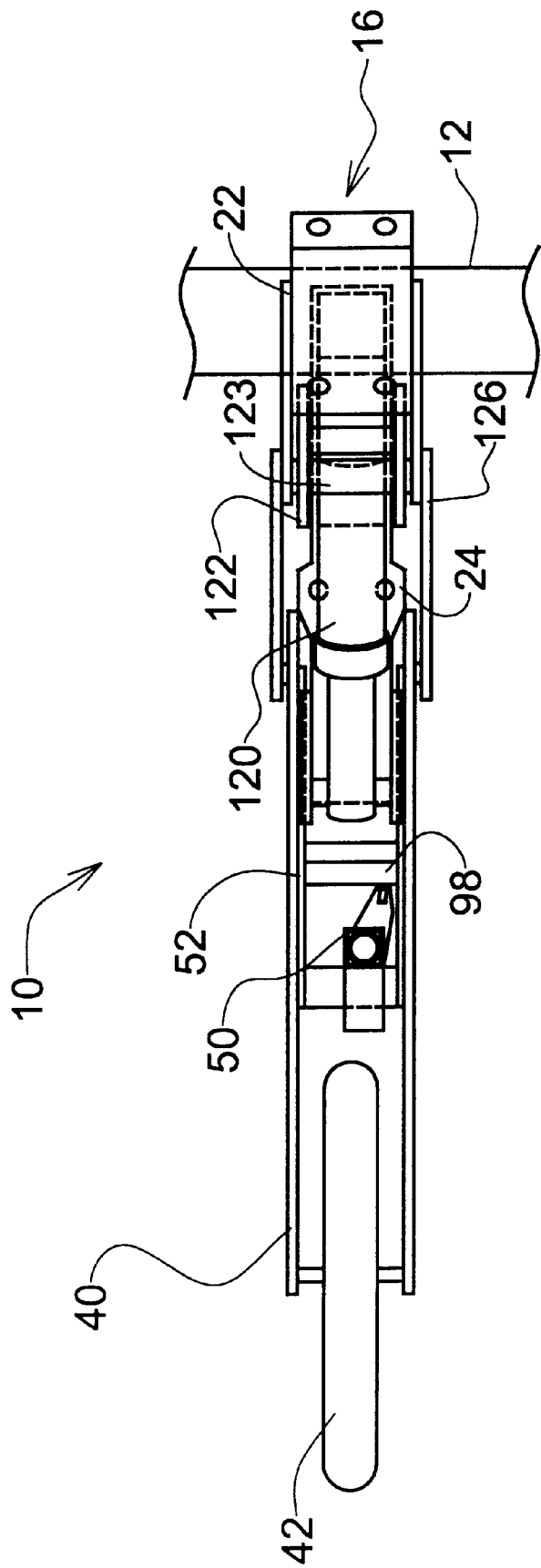
FIG. 9 is a top plan view of the embodiment of FIG. 6.

In a further embodiment of the assembly as shown in FIG. 7, both the wheel support member 40 and the base member 24 are linked to the mounting bracket 16. A hydraulic piston cylinder 140 is pivotally mounted at a piston end on the base member 24 at a position spaced rearward from the mounting bracket 16. The piston cylinder 140 extends upward and forward to a cylinder end pivotally mounted on the upright plates 22 adjacent a top end of the mounting bracket 16. In this arrangement the piston cylinder 140 contracts and extends in response to the knife being deflected up and down as it follows the contours of the ground.

A spring assembly 142 is pivotally mounted at a first end on the upright plates 22 adjacent the cylinder end of the piston cylinder 140. The spring assembly 142 extends downward and rearward to a second end which is pivotally mounted on the wheel support arm at a position adjacent to and rearward from the second material delivery tube. The spring assembly 142 includes a cylindrical chamber 144 having a fixed end 146 and an adjustable end 148 for adjusting the position of the packer wheel 42. The spring assembly can be adjusted at 149 by tightening a compression device. The adjustable end 148 comprises an end plate 152 for engaging the spring and a threaded mounting rod 154 mounting the end plate thereon such that the longitudinal position of the end plate is adjustable by rotating the end plate about the threads on the threaded mounting rod. The adjustment 149 is a threaded rod in a top member which can increase or decrease the pre-compression of the spring.

The knife support member 26 includes a curved upper portion 156, also shown in the first embodiment, which extends generally downward and rearward from the base member 24 at a similar inclination to the wheel support member 40 when in a working position as shown in FIG. 7. With the wheel support member being pivotally mounted adjacent a bottom of the curved upper portion 156, the wheel support member and a top end of the knife support member are substantially aligned. An upward or downward deflection of the knife 32 thus does not affect the deflection of the packer wheel for small deflections of the knife. If the knife is subjected to a large deflection due to a large obstacle on the ground, the wheel support member will follow the upward deflection of the knife support member 26 and the stop 98 of the bracket 52 which is pinned to the wheel support member 40. The packer wheel and the knife are thus able to deflect independently for small variations in the ground contour while the packer wheel and knife will deflect together for large obstacles for minimising damage to the assembly.

In this embodiment the force of the hydraulic piston cylinder 140 acts only on the knife support member 26. The force to the packer wheel and the connected second delivery tube is applied only by the spring assembly 142.

In further embodiments the hydraulic piston cylinders may be replaced with pneumatic cylinders or springs. The pneumatic cylinders and springs also provide a constant force on the knife and wheel support members while allowing the members to deflect upward in response to ground contours or obstacles in the ground as the assembly is pulled across the ground.

In a further arrangement, the spring assembly 142 is replaced by a hydraulic cylinder which may be connected to the same source and reservoir as the cylinder 140. Where high forces are required to be applied, it is preferred that hydraulic cylinders be used but in most cases the fluid to be applied can be air thus replacing the hydraulic fluid in a pneumatic system.

While the second material delivery member is shown in effect as only a tube with its lower end engaging the ground, the member may include more structural elements including reinforcing elements on the tube or a second knife which carries a flexible tube thereon.

While the arrangements described above include only a single second delivery member for depositing seed to one side of the fertilizer, alternative arrangements can include a third seed delivery tube arranged symmetrically relative to the second tube on the opposite side for dual seed delivery. Such arrangements are previously known and where this application refers to one seed tube, it will be understood that two such tubes may be included in the construction described.

While some embodiments of the present invention have been described in the foregoing, it is to be understood that other embodiments are possible within the scope of the invention. The invention is to be considered limited solely by the scope of the appended claims.

What is claimed is:

1. A dual material delivery assembly arranged to mount on a frame which is supported for movement in a forward direction, the assembly comprising:

a mounting bracket for mounting the assembly on the frame;

a furrowing element pivotally mounted on the mounting bracket, the furrowing element extending generally downward from the bracket to a ground penetrating end arranged to penetrate the ground for producing a furrow as the frame is moved across the ground in the forward direction;

a first material delivery tube mounted adjacent a rearward face of the furrowing element for depositing a first material in the ground rearward of the ground penetrating end of the furrowing element;

a packer wheel support element pivotally mounted on the furrowing element to extend generally rearward therefrom;

a second material delivery member mounted on the wheel support element including a second delivery tube spaced rearward from the first material delivery tube, the second material delivery member having a ground engaging end offset laterally and upward from the ground penetrating end of the furrow for engaging a side of the furrow and depositing a second material in the ground spaced upward and laterally offset from the first material;

a packer wheel mounted on the wheel support element rearward of the second material delivery member;

a fluid actuated cylinder for providing a force on the furrowing element and the packer wheel for urging the furrowing element and the packer wheel to engage the ground; and a control linkage mounted between the furrowing element and the wheel support element for controlling a distribution of the force between the furrowing element and the packer wheel.

2. The assembly according to claim 1 wherein the control linkage includes an adjustable mounting element having numerous linkage mounting locations thereon, each corresponding to a different distribution of the force between the furrowing element and the packer wheel.

3. The assembly according to claim 1 wherein the fluid actuated cylinder comprises a hydraulic piston cylinder.

4. The assembly according to claim 1 wherein the second material delivery member comprises:

an upper tube portion and a lower tube portion;

a pivot mounting the lower tube portion on the upper tube portion for pivotal movement of the lower portion relative to the upper portion;

a communicating element connected between the upper and lower tube portions for communicating the lower tube portion with the upper tube portion as the upper and lower tube portions are pivoted relative to one another; and a secondary biasing element urging the lower tube portion to extend downward and forward for engaging the ground.

5. A dual material delivery assembly arranged to mount on a frame which is supported for movement in a forward direction, the assembly comprising:

a furrowing element arranged to be supported by the frame for relative movement therebetween, the furrowing element extending generally downward to a ground penetrating end arranged to penetrate the ground for producing a furrow as the frame is moved across the ground in the working direction;

a first material delivery tube mounted rearward of the furrowing element for depositing a first material in the furrow;

a packer wheel support element arranged to be supported by the frame for relative movement therebetween, the packer wheel support element and the furrowing element being associated for common connection to the frame;

a second material delivery tube mounted rearward from the first material delivery tube for depositing a second material in the furrow, the second material delivery tube being connected to the packer wheel support element for common movement therewith;

a packer wheel mounted on the wheel support element rearward of the second material delivery member for common movement therewith; and a dual piston hydraulic piston cylinder having:

a cylinder end section arranged for connection to the frame;

a central section slidably mounted within the cylinder end and having a pivotal mount thereon pivotally coupling one of the elements thereto to transmit downward force to the element coupled thereto when the central section is displaced within the cylinder end;

and a piston end section slidably mounted within the cylinder end and having a pivotal mount thereon pivotally coupling the other one of the elements thereto to transmit downward force to the element coupled thereto when the piston end section is displaced within the central section.

6. The assembly according to claim 5 wherein there is provided a control linkage comprising a pair of links mounted between the furrowing element and the wheel support element, the piston end section being mounted on one of the links for controlling a distribution of the force between the furrowing element and the packer wheel.

7. The assembly according to claim 6 wherein there is provided numerous mounting locations on at least one of the rinks, each mounting location being arranged to mount the links at a different relative orientation therebetween corresponding to different distribution of the force.

8. A dual material delivery assembly arranged to mount on a frame which is supported for movement in a forward direction, the assembly comprising:

a furrowing element arranged to be supported by the frame for relative movement therebetween, the furrowing element extending generally downward to a ground penetrating end arranged to penetrate the ground for producing a furrow as the frame is moved across the ground in the working direction;

a first material delivery tube mounted rearward of the furrowing element for depositing a first material in the furrow;

a packer wheel support element arranged to be supported by the frame for relative movement therebetween, the packer wheel support element and the furrowing element being associated for common connection to the frame;

a second material delivery tube mounted rearward from the first material delivery tube for depositing a second material in the furrow, the second material delivery tube being connected to the packer wheel support element for common movement therewith;

a packer wheel mounted on the wheel support element rearward of the second material delivery member for common movement therewith;

a fluid actuated cylinder for providing a force on the furrowing element and the wheel support element for urging the furrowing element and the wheel support element to engage the ground; and an adjustable spring arranged to be mounted between one of the elements and the the frame such that adjustment of a compression force of the spring adjusts a force on the element coupled thereto relative to the other element for controlling a distribution of the force between the furrowing element and the packer wheel.

9. The assembly according to claim 8 wherein the fluid actuated cylinder is arranged to be mounted between the furrowing element and the frame and the spring is arranged to be mounted between the wheel support element and the frame and wherein the wheel support element is pivotally mounted on the furrowing element to extend generally rearward therefrom.

10. A dual material delivery assembly arranged to mount on a frame which is supported for movement in a forward direction, the assembly comprising:

a furrowing element arranged to be supported by the frame for relative movement therebetween, the furrowing element extending generally downward to a ground penetrating end arranged to penetrate the ground for producing a furrow as the frame is moved across the ground in the working direction;

a first material delivery tube mounted rearward of the furrowing element for depositing a first material in the furrow;

a packer wheel support element arranged to be supported by the frame for relative movement therebetween, the packer wheel support element and the furrowing element being associated for common connection to the frame;

a second material delivery tube mounted rearward from the first material delivery tube for depositing a second material in the furrow, the second material delivery tube being connected to the packer wheel support element for common movement therewith;

a packer wheel mounted on the wheel support element rearward of the second material delivery member for common movement therewith;

a crank arm mounted on one of the elements;

a lever arranged to be pivotally coupled to the frame at a first end, and pivotally connected to the crank arm at a second end; and a fluid actuated linear actuator being mounted at a first end on the other element and being mounted at a second end on the lever the actuator being arranged to produce a pair of opposing forces at respective ends thereof to provide downward pressure forces acting on the furrowing element and the wheel support element respectively such that the wheel support element and the furrowing element can be deflected upward independently resulting in a corresponding end of the linear actuator being deflected inward.

11. The assembly according to claim 10 wherein there is provided a link connecting the lever to the crank arm, the lever and the crank arm having numerous mounting locations for mounting the link thereon, each mounting location corresponding to different length of the lever and the crank arm for adjusting the distribution of the downward force between the furrowing element and the wheel support element by selecting the mounting location of the link.

12. The assembly according to claim 10 wherein the actuator is a hydraulic piston cylinder connected between the furrowing element and the wheel support element, the lever being arranged to connect the hydraulic piston cylinder to the wheel support element.

13. A dual material delivery assembly arranged to mount on a frame which is supported for movement in a forward direction, the assembly comprising:

a mounting bracket for mounting the assembly on the frame;

a furrowing element being pivotally mounted on the mounting bracket, the furrowing element extending generally downward from the bracket to a ground penetrating end arranged to penetrate the ground for producing a furrow as the frame is moved across the ground in the forward direction;

a first material delivery tube mounted on a rearward face of the furrowing element for depositing a first material in the ground rearward of the ground penetrating end of the furrowing element;

a wheel support element mounted rearward from the furrowing element;

a second material delivery member mounted on the wheel support element including a second material delivery tube spaced rearward from the first material delivery tube, the second material delivery member having a ground engaging end offset laterally and upward from the ground penetrating end of the furrow for engaging a side of the furrow and depositing a second material in the ground spaced upward and laterally offset from the first material;

a packer wheel mounted on the wheel support element rearward of the second material delivery tube; and a main biasing element urging the furrowing element and the wheel support element to engage the ground;

the second material delivery tube comprising;

an upper tube portion and a lower tube portion;

a pivot mounting the lower tube portion on the upper tube portion for pivotal movement of the lower portion relative to the upper portion;

a tubular connecting element connected between the upper and lower tube portions for connecting the lower tube portion with the upper tube portion for communication of materials therethrough as the upper and lower tube portions are pivoted relative to one another; and a secondary biasing element urging the lower tube portion to extend downward and forward for engaging the ground.

14. The assembly according to claim 13 wherein there is provided a lug mounted on a forward face of the lower tube portion, the lug extending upward for engaging a forward face of the upper tube portion in a working position such that a deflection of the lower tube portion in response to ground contours is restricted in the forward direction.

15. The assembly according to claim 13 wherein the secondary biasing element comprises a hydraulic piston cylinder mounted at a first end to the upper tube portion at a position spaced upward from the pivot and mounted at a second end on the lower tube portion at a position spaced downward from the pivot.

16. The assembly according to claim 15 wherein there is provided a rearward extending lug on the lower tube portion for mounting the hydraulic cylinder thereon such that the lug acts as a crank for pivoting the lower tube portion relative to the upper tube portion as the hydraulic piston cylinder is contracted and extended.

17. The assembly according to claim 13 wherein the secondary biasing element comprises a spring connected between the upper and lower tube portions.

18. The assembly according to claim 17 wherein the spring is mounted about a longitudinal axis, the spring being mounted at a first end on the upper tube portion at a position spaced upward from the pivot and at a second end on the lower tube portion at a position spaced downward from the pivot such that the spring is extended and contracted along the longitudinal axis as the lower tube portion is pivoted relative to the upper tube portion.

* * * * *